United States Patent [19]

Hwang

[11] Patent Number: 5,403,027
[45] Date of Patent: Apr. 4, 1995

[54] BICYCLE WITH FOLDING FRAME

[76] Inventor: Chul Hwang, 146-11 Beech Ave., Flushing, N.Y. 11355

[21] Appl. No.: 113,780

[22] Filed: Aug. 27, 1993

[51] Int. Cl.$^6$ ............................................. B62M 1/02
[52] U.S. Cl. ................................. 280/261; 280/278
[58] Field of Search ............. 280/259, 260, 261, 278, 280/287, 284, 288

[56] References Cited

U.S. PATENT DOCUMENTS

| | | | |
|---|---|---|---|
| 559,299 | 4/1896 | Matthern | 280/261 |
| 906,293 | 12/1908 | Robinson | 280/261 |
| 2,929,641 | 3/1960 | Alvistur | 280/261 |
| 4,248,448 | 2/1981 | Dmitrowsky | 280/288.1 |
| 4,418,784 | 12/1983 | Fox | 180/221 |
| 4,463,963 | 8/1984 | Martin | 280/253 |
| 4,473,236 | 9/1984 | Stroud | 280/258 |
| 4,564,206 | 1/1986 | Lenhardt | 280/252 |
| 4,568,097 | 2/1986 | Farooq | 280/216 |
| 4,584,889 | 4/1986 | Patroni, Jr. | 280/248 |
| 4,666,173 | 5/1987 | Graham | 280/255 |
| 5,125,678 | 6/1992 | Bogen | 280/278 |
| 5,193,834 | 3/1993 | Strozyk | 280/278 |
| 5,228,710 | 7/1993 | Lu | 280/259 |
| 5,271,635 | 12/1993 | Lu | 280/259 |

FOREIGN PATENT DOCUMENTS

| | | | |
|---|---|---|---|
| 154118 | 9/1985 | European Pat. Off. | 280/261 |
| 22021 | of 1894 | United Kingdom | 280/261 |
| 8000684 | 4/1980 | WIPO | 280/259 |

*Primary Examiner*—Margaret A. Focarino
*Assistant Examiner*—Kevin Hurley
*Attorney, Agent, or Firm*—Darby & Darby

[57] ABSTRACT

A drive unit of a bicycle includes a crankshaft having a pair of cranks, a chain wheel fixed to the crankshaft, and a free wheel fixed to a rotating shaft of a rear wheel and rotatably mounted on the crankshaft. An opposed pair of support frames rotatably support the crankshaft as well as the rear wheel and is hinged to a horizontal frame supporting a saddle such that the rear wheel support frames can be folded about the hinge to reduce the total length of the bicycle. A speed change unit includes a shaft rotatably supported by the pair of support frames on which a free wheel and a speed change wheel are mounted. A pair of chains connect the crankshaft and the free wheel of the drive unit to the speed change wheel and the free wheel of the speed change unit to transmit the rotating force of the chain wheel to the free wheel of the drive unit. The hinge locates the axis of the crankshaft of the drive unit on or behind a vertical center line of the saddle to reduce fatigue in operating the bicycle.

8 Claims, 2 Drawing Sheets

BICYCLE WITH FOLDING FRAME

BACKGROUND OF THE INVENTION

1. Field of the Invention

The present invention relates in general to a bicycle, and more particularly to a bicycle having a folding frame suitable for reducing its total length and rendering a crankshaft located on or behind a vertical center line of a saddle to prevent undesirable fatigue of a rider.

2. Description of the Prior Art

Conventionally, the bicycles are classified into two types, that is, bicycles for practical use such as a commuter's bicycle, a cargo bicycle and the like, and special bicycles such as a racing bicycle, a mountain bicycle and the like.

In a known bicycle irrespective of its type, it is required to shorten the distance between its front wheel and its rear wheel in order to achieve a desired mobility, a desired high speed and desired lightness. However, it is known to those skilled in the art that there is a limit in shortening the distance between the front wheel and the rear wheel of the bicycle irrespective of its type due to its intrinsic structure as described hereinbelow.

With reference to FIG. 1, there is shown a known bicycle in a side view. The bicycle includes a front wheel rotating shaft 21, a chain wheel rotating shaft 22, a rear wheel rotating shaft 23, a saddle 24 and a handle bar 25. As shown in this drawing, the distance Z between the front wheel rotating shaft 21 and the rear wheel rotating shaft 23 is equal to the sum of the distance A between the front wheel rotating shaft 21 and the chain wheel rotating shaft 22 and the distance B between the chain wheel rotating shaft 22 and the rear wheel rotating shaft 23.

It has been noted that there is a limit in shortening the distance A between the front wheel rotating shaft 21 and the chain wheel rotating shaft 22. That is, a minimum safety space A1 should be defined between the front end of the rotating circle of the pair of crank pedals rotatably mounted on individual cranks and the rear end of the front wheel in order to prevent interference between the rotating crank pedals and the front wheel which is to be freely turned about its turning shaft rightwards and leftwards to change the running course of the bicycle, thus to limit shortening of the distance A.

On the other hand, the limit in shortening the distance B between the chain wheel rotating shaft 22 and the rear wheel rotating shaft 23 is caused by a minimum safety space B1 which should be defined between the front end of the rear wheel and the chain wheel rotating shaft 22. From the above description, it will be apparent to those skilled in the art that the presence of the chain wheel rotating shaft 22 causes the limit in shortening the distance Z between the front wheel rotating shaft 21 and the rear wheel rotating shaft 23. Hence, when the chain wheel rotating shaft 22 is removed from the position between the front and rear wheels, it is possible to desirably reduce, preferably to minimize the distance Z between the front wheel rotating shaft 21 and the rear wheel rotating shaft 23.

In addition, the saddle of the known bicycle, on which the waist and the buttocks of a rider functioning as a central point of the rider's body are placed, is located behind the vertical center line of the chain wheel rotating shaft 22 in question and this causes unnaturalness of the rider's posture. That is, the chain wheel rotating shaft 22 is regarded as the most important element of the bicycle to which all rider's power is devoted since it is a central point of the pedal rotating operation generating the driving force of the bicycle. However, since the saddle is placed at the rear of the chain wheel rotating shaft 22 and the handle bar is placed at the far front of the shaft 22, the rider should zealously rotate, in order to run the bicycle, the pair of pedals about the shaft 22 as greatly bending his body about the waist and the buttocks laid on the saddle. Such a sitting posture is regarded as an unnatural posture for exercise carried out by the lower part of the body when considering the fact that a human being walks in an erect posture. Such a sitting posture, therefore, prevents the rider from using his maximum quantity of motion and troubles prevention of undesirable fatigue imposed on the rider.

In order to overcome the aforementioned problem, it is required to place the chain wheel rotating shaft 22 on or behind the vertical center line of the saddle, however, this location of the shaft 22 also causes the rear wheel rotating shaft 23 to be shifted to a position which is a long away behind the present position shown in the drawing. The distance Z between the front wheel rotating shaft 21 and the rear wheel rotating shaft 23 or the total length of the bicycle should be thus remarkably increased and this opposes to the recent trend of improved mobility, of high speed and of lightness of bicycles, especially of modern sports or leisure bicycles. One approach to the location of the chain wheel rotating shaft behind the vertical center line of the saddle without lengthening the distance between the front wheel rotating shaft and the rear wheel rotating shaft is to reduce the diameter of the rear wheel to be less than that of the front wheel. However, such a reduction of the diameter of the rear wheel can not effectively solve the above problem.

SUMMARY OF THE INVENTION

It is, therefore, an object of the present invention to provide a bicycle which overcomes the aforementioned problem by making the rotating center of a chain wheel as well as the rotating center of a rear wheel concentric with a crankshaft and by locating the rotating center of the crankshaft on or behind the vertical center line of a saddle, thereby maximizing the using efficiency of the quantity of motion of a rider and allowing the rider to feel no undesirable fatigue in running the bicycle.

It is another object of the present invention to provide a bicycle which includes a pair of rear wheel supporting frames which are hinged to a horizontal frame of the bicycle to be folded about a hinge shaft hinging the supporting frames to the horizontal frame, thereby reducing the distance between the front wheel rotating shaft and the rear wheel rotating shaft or the total length of the bicycle as occasion demands.

It is further object of the present invention to provide a bicycle which includes a gear box provided on a rotating shaft rotatably supported by the rear wheel supporting frames such that its structure has symmetry about the rear wheel, thus improving the stability of the rear wheel.

To accomplish the above objects, the present invention provides a bicycle having: a drive unit with a crankshaft connected at both ends thereof to a pair of cranks having individual pedals rotatably mounted thereon, a chain wheel fixed to the crankshaft to be rotate at the same time of rotation of the crankshaft, and a free wheel fixed to a rotating shaft of a rear wheel and rotatably mounted on the crankshaft, and adapted for rotating the rotating shaft of the rear wheel using a rotating force of the chain wheel to rotate the rear wheel about the crankshaft; an opposed pair of support frames rotatably supporting the crankshaft as well as the rear wheel and being connected to a horizontal frame, the horizontal frame supporting a saddle and connecting a front part and a rear part of the bicycle together; a speed change gear comprising a rotating shaft rotatably supported by the opposed pair of support frames at predetermined sections of the support frames, and a free wheel and a speed change wheel, both wheels being fixed to the rotating shaft of the speed change gear; and a first chain and a second chain connecting the crankshaft and the free wheel of the drive unit to the speed change wheel and the free wheel of the speed change gear, respectively, to transmit the rotating force of the chain wheel to the free wheel of the drive unit.

The crankshaft of the drive unit is located on or behind a vertical center line of the saddle, thus allowing the rider to feel no undesirable fatigue in running the bicycle.

The opposed pair of supporting frames is hinged to the horizontal frame by a hinge shaft such that the supporting frames are folded about the hinge shaft in order to reduce a distance between a front wheel rotating center and a rear wheel rotating center of the bicycle as occasion demands.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENT

Figure 1:
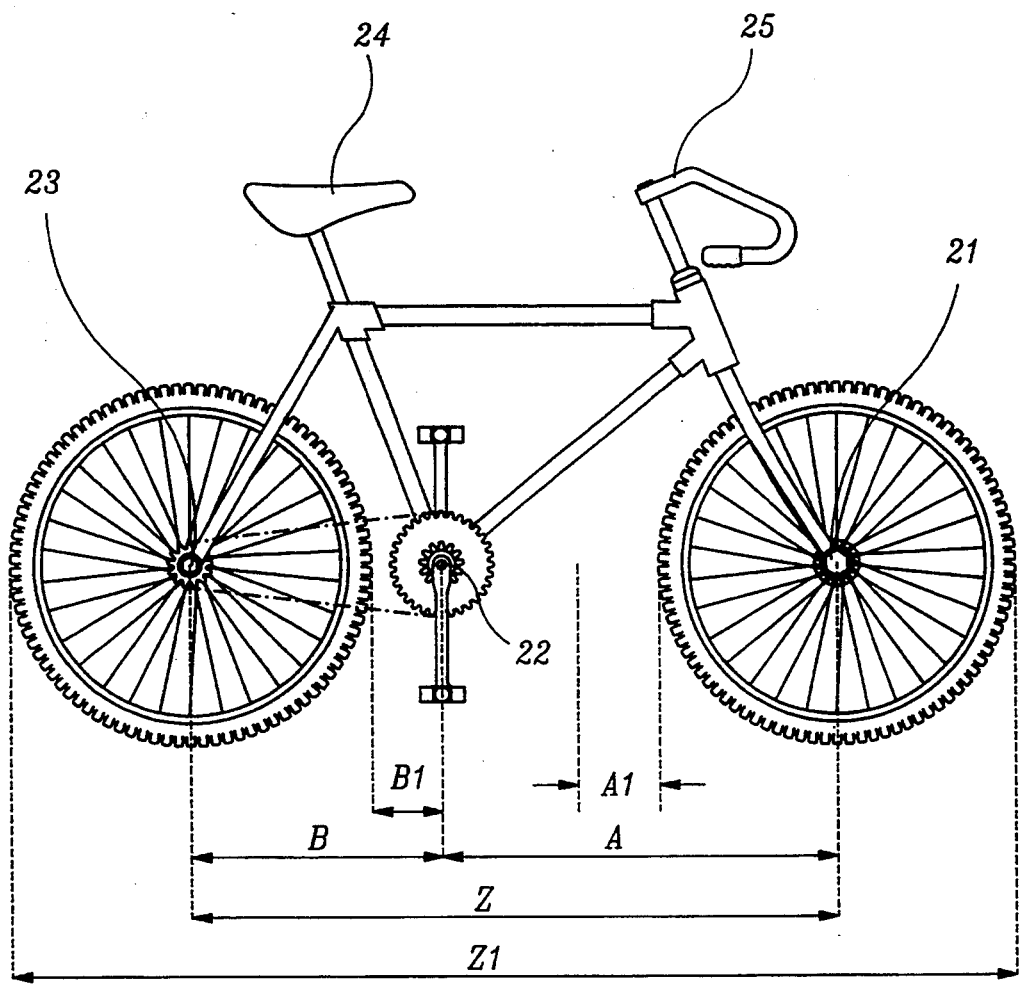
FIG. 1 is a side view of a bicycle in accordance with the prior art.
Figure 2:
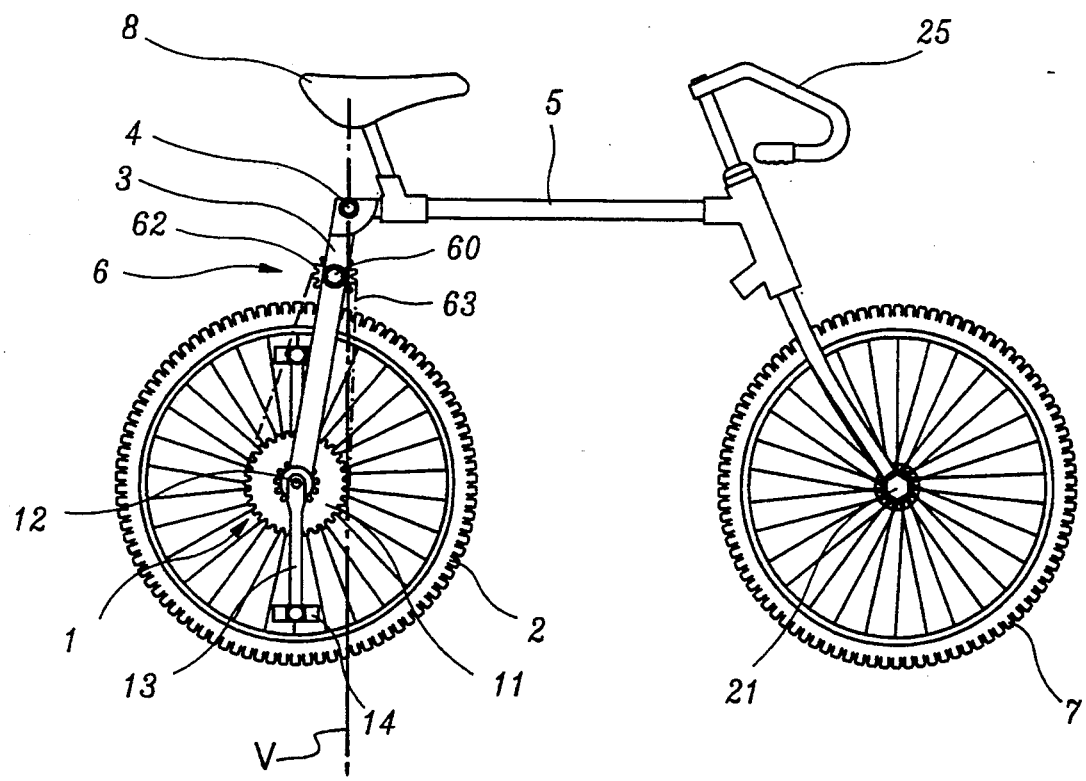
FIG. 2 is a side view of a bicycle in accordance with a preferred embodiment of the present invention.
Figure 3:
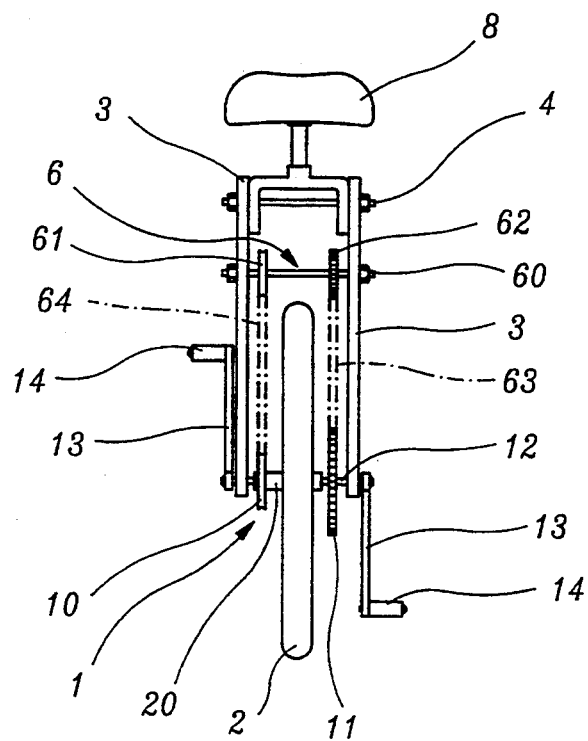
FIG. 3 is a rear view of the bicycle of the present invention for showing a drive unit and a speed change gear.

With reference to FIGS. 2 and 3, there is shown a bicycle in accordance with a preferred embodiment of the present invention in a side view and in a rear view, respectively. The bicycle of this invention includes a drive unit 1 which has a free wheel 10, a chain wheel 11, a crankshaft 12, a pair of cranks 13 connected to both ends of the crankshaft 12, and a pair of pedals 14 rotatably mounted on individual cranks 13. A rear wheel rotating shaft 20, to which the free wheel 10 is fixed, is rotatably mounted on the crankshaft 11 of the drive unit 1. The bicycle further includes an opposed pair of rear wheel supporting frames 3 which are connected to a horizontal frame 5 of the bicycle by a hinge shaft 4 such that frames 3 are folded about the hinge shaft 4 as occasion demands in order to reduce the distance between a front wheel rotating shaft 21 and the rear wheel rotating shaft 20 or the total length of the bicycle as will be described later herein. A rotating shaft 60 is rotatably supported at its both ends by predetermined upper sections of the opposed pair of rear wheel supporting frames 3 such that it is rotated with respect to the supporting frames 3. This rotating shaft 60 constitutes a speed change gear 6 which further includes a free wheel 61 and a speed change wheel 62, both being fixed to the rotating shaft 60 at opposite sides of a rear wheel 2 such that they are spaced apart from each other by a distance and rotated at the same time of rotation of the rotating shaft 60. The chain wheel 11 of the drive unit 1 is connected to the speed change wheel 62 of the speed change gear 6 by a first chain 63 to cooperate with the wheel 62. In the same manner, the free wheel 61 of the speed change gear 6 is connected to the free wheel 10 of the drive unit 1 by a second chain 64 to cooperate with the wheel 10. Thus, the rotating force generated by the rotation of the cranks 13 is transmitted to the rear wheel rotating shaft 20 through the crankshaft 12, the chain wheel 11, the first chain 63, the speed change wheel 62, the free wheel 61 of the speed change gear 6, the second chain 64 and the free wheel 10 of the drive unit 1 in order, thereby rotating the rear wheel 2 fixed to the rear wheel rotating shaft 20. As shown in the drawings, the pair of free wheels 10 and 61 cooperating with each other by the second chain 64 and the chain wheel 11 and the speed change wheel 62 cooperating with each other by the first chain 63 are arranged to be symmetrical about the rear wheel 2, so that the stability of the rear wheel 2 is remarkably improved as will be described later herein.

In the drawings, the reference numerals 7 and 8 denote a front wheel and a saddle, respectively.

In operation, the rider sitting on the saddle 8 rotates the pair of pedals 14 by the feet to rotate the crankshaft 12 and the chain wheel 11, thus generating the rotating force. This rotating force is transmitted to the rear wheel rotating shaft 20 through the first chain 63 wrapping about the chain wheel 11, the speed change wheel 62 connected to the chain wheel 11 by the chain 63, the free wheel 61 of the speed change gear 6, the second chain 64, and the free wheel 10 of the drive unit 1 in order, thereby rotating the rear wheel 2 fixed to the rear wheel rotating shaft 20 as described above. In this case, the rotating center of the chain wheel 11 as well as the rotating center of the rear wheel 2 is concentric with the crankshaft 12 and the rotating center of the crankshaft 12 is located on or behind the vertical center line V of the saddle 8, thereby maximizing the using efficiency of quantity of motion of the rider and allowing the rider to feel no undesirable fatigue in running the bicycle. That is, the angle between the upper part and the lower part of the rider's body bent about the waist and the buttocks is increased such that the rider's body shows a posture similar to that of a swimmer in the breaststroke position, thus achieving improvement of the efficiency of the exercise of the lower part of the body. Such a posture also achieves a regular pulse and a smooth breath, and reduces fatigue imposed on the rider in running the bicycle.

In addition, the opposed pair of rear wheel supporting frames 3 are connected to the horizontal frame 5 by the hinge shaft 4 such that they are folded about the hinge shaft 4 as occasion demands as described above. In this regard, the distance between the front wheel rotating shaft 21 and the rear wheel rotating shaft 20 or the total length of the bicycle is adjusted as desired. Such a holding structure of the supporting frames 3 renders the bicycle compacted by holding the supporting frames 3 such that the rear and front wheels 2 and 7 come into contact together when the bicycle is required to be carried with one or to be kept in the inside of a house or in the luggage compartment of a car.

The free wheel 61 and the speed change wheel 62 of the speed change gear 6 fixedly mounted on the rotating shaft 60 rotatably supported by the opposed pair of rear wheel supporting frames 3 are opposed to each other about the rear wheel 2. In the same manner, the free wheel 10 and the chain wheel 11 of the drive unit 1 are opposed to each other about the rear wheel 2. Here, the wheels 10 and 11 cooperate with the free wheel 61 and the speed change wheel 62 by the second chain 64 and the first chain 63, respectively, as described above. Due to the symmetrical structure of the drive unit 1 and the speed change gear 6, the stability of the rear wheel 2 is improved and this compensates a structural drawback in the rear wheel 2. Furthermore, the tensile force imposed on the chain, the chain conventionally bearing the weight of the rider as well as the driving force of the bicycle, is divided into two parts by the two chains, that is, the first and second chains 63 and 64, thus minimizing the burden imposed on the chains 63 and 64 due to the tensile force.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bicycle having a front wheel and a rear wheel, and a main frame having a horizontal portion with said front and rear wheels being mounted to said main frame and further comprising:
    a saddle mounted to said horizontal portion of said main frame;
    a pair of spaced frames for supporting the rear wheel therebetween with means at one end for coupling said spaced frames to said main frame horizontal portion;
    a first shaft rotatably mounted at and between the other end of said rear wheel supporting frames on which said rear wheel is mounted, and a chain wheel fixedly mounted on said first shaft on one side of said rear wheel and a first free wheel fixedly mounted on said first shaft on the other side of said rear wheel;
    a driving unit for said rear wheel comprising a crankshaft at each end of said first shaft having a pedal attached thereto;
    a second shaft rotatably mounted between said rear wheel supporting frames;
    a speed changing unit comprising:
        a speed change wheel fixedly mounted on said second shaft on the same side of said rear wheel as the chain wheel and a chain connecting said chain wheel and said speed hinge wheel, and
        a second free wheel on said second shaft on the same side of said rear wheel as said first free wheel and a chain coupling said first free wheel to said second free wheel.

2. A bicycle as in claim 1 wherein said second shaft lies between said first shaft and said horizontal portion of said main frame.

3. A folding frame type bicycle having a front wheel and a rear wheel, and a main frame having a horizontal portion with said front and rear wheels being mounted to said main frame and further comprising:
    a saddle mounted to said horizontal portion of said main frame;
    a pair of spaced frames for supporting the rear wheel therebetween with means at one end for coupling said spaced frames to said main frame horizontal portion;
    a first shaft rotatably mounted at and between the other end of said rear wheel supporting frames on which said rear wheel is mounted and a chain wheel and wheel fixedly mounted to said rotatable first shaft;
    a driving unit for said rear wheel comprising a crankshaft at each end of said first shaft having a pedal attached thereto;
    a second shaft rotatably mounted between said rear wheel supporting frames;
    a speed changing unit comprising:
        a speed change wheel and a second free wheel fixedly mounted on said second shaft;
        a chain coupling said chain wheel and said speed change wheel and a chain coupling said first free wheel and said second free wheel,
    said means for coupling said spaced rear wheel supporting frames to said main frame horizontal portion including hinge means to adjust the position of said spaced frames and rear wheel relative to the front wheel.

4. A bicycle as in claim 3 wherein said spaced rear wheel supporting frames are adjustable by said hinge means to place the axis of said first shaft on or to the rear of a vertical center line relative to said saddle.

5. A bicycle as in claim 3 wherein said second shaft is located between said spaced rear wheel supporting frames above said first shaft.

6. A bicycle as in claim 3 wherein said chain wheel and said first free wheel are located on opposite sides of said rear wheel and said speed change wheel and said second free wheel are positioned on said second rotating shaft respectively aligned with said chain wheel and said first free wheel.

7. A bicycle as in claim 6 wherein said second shaft is located between said spaced rear wheel supporting frames above said first shaft.

8. A bicycle as in claim 6 wherein said speed change wheel and said second free wheel are mounted on said second shaft on opposite sides of said rear wheel.

* * * * *